United States Patent
Mohan et al.

(10) Patent No.: US 12,114,202 B2
(45) Date of Patent: Oct. 8, 2024

(54) METHOD AND APPARATUS OF SUPERVISED LEARNING APPROACH FOR REDUCING LATENCY DURING CONTEXT SWITCHOVER IN 5G MEC

(71) Applicant: SAMSUNG ELECTRONICS CO., LTD., Suwon-si (KR)

(72) Inventors: Santhosh Mohan, Bangalore (IN); Sridharan Natarajan, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 441 days.

(21) Appl. No.: 17/593,199

(22) PCT Filed: Aug. 27, 2021

(86) PCT No.: PCT/KR2021/011550
§ 371 (c)(1),
(2) Date: Sep. 10, 2021

(87) PCT Pub. No.: WO2022/045841
PCT Pub. Date: Mar. 3, 2022

(65) Prior Publication Data
US 2022/0312256 A1 Sep. 29, 2022

(30) Foreign Application Priority Data

Aug. 27, 2020 (IN) .............................. 202041036951
Aug. 19, 2021 (IN) .............................. 202041036951

(51) Int. Cl.
H04W 28/02 (2009.01)
H04L 41/16 (2022.01)
(Continued)

(52) U.S. Cl.
CPC ......... *H04W 28/0268* (2013.01); *H04L 41/16* (2013.01); *H04W 28/24* (2013.01); *H04W 36/0022* (2013.01); *H04W 88/18* (2013.01)

(58) Field of Classification Search
CPC ............. H04W 28/0268; H04W 28/24; H04W 36/0022; H04W 88/18; H04W 40/34;
(Continued)

(56) References Cited

U.S. PATENT DOCUMENTS

2004/0066779 A1   4/2004   Barrack et al.
2005/0220054 A1   10/2005  Meier et al.
(Continued)

FOREIGN PATENT DOCUMENTS

CN      1497433      5/2004
CN      102088743    12/2013
(Continued)

OTHER PUBLICATIONS

Behravesh et al., "Joint User Association and VNF Placement for Latency Sensitive Applications in 5G Networks" *2019 IEEE*, (7 pages).
(Continued)

*Primary Examiner* — Steven Hieu D Nguyen
(74) *Attorney, Agent, or Firm* — Nixon & Vanderhye, P.C.

(57) ABSTRACT

The disclosure provides to a method and an apparatus for supervised learning approach for reducing latency during a context switchover in a 5G Multi-access Edge Computing (MEC). An example method for performing a context switchover in a wireless network includes identifying a plurality of first parameters associated with a user equipment (UE) and a plurality of second parameters associated with an edge network entity; receiving a data path change notification from a session management entity; determining a ranking
(Continued)

for each of a plurality of edge application servers (EASs) based on the plurality of first parameters and the plurality of second parameters, in response to reception of the data path change notification; selecting at least one target EAS of the plurality of EASs based on the ranking for each of the plurality of EASs; and performing the context switchover to the at least one target EAS.

18 Claims, 11 Drawing Sheets

(51) Int. Cl.
*H04W 28/24* (2009.01)
*H04W 36/00* (2009.01)
*H04W 88/18* (2009.01)

(58) Field of Classification Search
CPC ..... H04L 41/16; H04L 65/80; H04L 65/1095; G06N 3/045; G06N 20/20; G06N 20/10
See application file for complete search history.

(56) References Cited

U.S. PATENT DOCUMENTS

| | | |
|---|---|---|
| 2017/0272365 A1 | 9/2017 | Wei et al. |
| 2018/0183855 A1* | 6/2018 | Sabella ............... G06F 9/5072 |
| 2020/0120549 A1 | 4/2020 | Sun et al. |
| 2020/0128471 A1 | 4/2020 | Liu |
| 2020/0204614 A1 | 6/2020 | Schmitz et al. |
| 2020/0220875 A1* | 7/2020 | Harguindeguy ...... H04L 63/101 |
| 2020/0249039 A1 | 8/2020 | Lassoued et al. |
| 2020/0351336 A1 | 11/2020 | Campbell et al. |
| 2021/0250838 A1* | 8/2021 | Lu ....................... H04W 36/08 |
| 2022/0329649 A1* | 10/2022 | Feng ................... H04L 67/1001 |
| 2023/0188965 A1* | 6/2023 | Yao ....................... H04W 8/005 455/414.1 |
| 2023/0337095 A1* | 10/2023 | Mihaly ................. H04W 76/22 |

FOREIGN PATENT DOCUMENTS

| | | |
|---|---|---|
| KR | 10-2007-0103980 | 10/2007 |
| WO | 2017/071582 | 5/2017 |
| WO | 2020/083266 | 4/2020 |

OTHER PUBLICATIONS

Bouet et al., "Mobile Edge Computing Resources Optimization: a Geo-clustering Approach" *IEEE Transactions on Network and Service Management*, IEEE, 2018, 15 (2), pp. 787-796.

Lee et al., "Low Cost MEC Server Placement and Association in 5G Networks" *ICTC 2019*, IEEE, pp. 879-882.

Natarajan et al., "A Supervised Learning Approach for Reducing Latency during Context Switchover in 5G MEC" *2021 IEEE 18th Annual Consumer Communications & Networking Conference (CCNC)*, (2 pages).

Natarajan et al., "Latency Reduction in 5G MEC during Context Switchovers using Learning-to-Rank Algorithms on Edge Application Servers" (6 pages), 2021.

International Search Report and Written Opinion dated Aug. 27, 2020 in corresponding International Application No. PCT/KR2021/011550.

Yunoki et al., "Carry-on State Service Handover between Edge Hosts for Latency Strict Applications in Mobile Networks", The 21st International Symposium on Wireless Personal Multimedia Communications (WPMC-2018), May 13, 2019.

Examination Report dated May 27, 2022 in Indian Patent Application No. 202041036951 and English-language translation.

* cited by examiner

METHOD AND APPARATUS OF SUPERVISED LEARNING APPROACH FOR REDUCING LATENCY DURING CONTEXT SWITCHOVER IN 5G MEC

CROSS-REFERENCE TO RELATED APPLICATIONS

This application is a national stage of International Application No. PCT/KR2021/011550 designating the United States, filed on Aug. 27, 2021, in the Korean Intellectual Property Receiving Office and claiming priority to Indian Provisional Patent Application No. 202041036951, filed on Aug. 27, 2020, and Indian Complete Patent Application No. 202041036951, filed on Aug. 19, 2021, the disclosures of which are incorporated by reference herein in their entireties.

BACKGROUND

1. Field

The disclosure relates to a method and an apparatus for supervised learning approach for reducing latency during a context switchover in a 5G Multi-access Edge Computing (MEC).

2. Description of Related Art

In general, Multi-access Edge Computing (MEC) systems are important in 5G architecture to meet rigorous latency requirements for 5G applications (e.g. Ultra-Reliable Low Latency Communications (URLLC), Vehicle-to-everything (V2X), etc.). In Release-16 (TS23.558 2.0.0), $3^{rd}$ Generation Partnership Project (3GPP) proposed an architecture solution for 5G-MEC systems. With reference to FIG. 1, an existing 3GPP 5G-MEC architecture includes four key components, which are an Edge Enabler Client (EEC) 22, an Edge Application Server(s) (EAS) 11, an Edge Enabler Server (EES) 12 and an Edge Configuration Server (ECS) 13. EAS 11 enables a User Equipment (UE) 20 to access an edge infrastructure to satisfy the latency requirements and assists the UE 20 in offloading computations. The EEC 22 and the EES 12 detect the edge infrastructure and associate the EAS 11 and Application Client (AC) 21 running at the UE 20.

In the existing 3GPP 5G-MEC architecture, the ECS 13 is a configuration server where many EESs 12 offer registered services, allowing the UE 20 to discover many EASs 11 offering services in an edge data network 10. The EAS(s) 11 are deployed in certain locations, and when a data path of the UE 20 changes, a change in Data Network Access Identifier (DNAI) information may be triggered. The change in the data path or the DNAI information must be notified to the EES 12 from a 3GPP Network/5G core 30, and the EES 12 notifies a source EAS (e.g. EAS 11) that the UE 20 is using, assists the UE 20 in selecting a target EAS server (not shown in FIG. 1), and performs a context switchover from the source EAS to the target EAS for service continuity.

There is a problem with the existing 3GPP 5G-MEC architecture when several EASs 11 (e.g., EAS-1 11a, EAS-2 11b, etc. in FIG. 2A) are associated with the UE 20 at the same time and notice for change in the DNAI information is received from the 3GPP network. The EES 12 must decide a sequence/order in which the EASs 11 are alerted in this situation. The sequence is critical in maintaining the latency requirements of both the EEC 22 and the EASs 11 for maintaining service continuity during context transfer. An improper notification sequence may fail to fulfill Key Performance Indicators (KPIs) of the EASs 11, such as satisfying latency requirements and providing service continuity during the context transfer, when the number of EASs 11 increases. The existing 3GPP 5G-MEC architecture uses a static method to solve this problem, but the static method is insufficient to provide the needed Quality of Service (QoS) to the UE 20, resulting in low Quality of Experience (QoE) to a user of the UE 20. Thus, it would be desirable to provide a useful alternative to improve the QoS in the existing 3GPP 5G-MEC architecture.

SUMMARY

Embodiments of the disclosure rank each EAS of a plurality of EASs by applying a Machine Learning (ML) model (e.g., Learning to Rank for Information Retrieval (LETOR), Ranking Support Vector Machine (RankSVM), eXtreme Gradient Boosting (XGBoost), etc.) on a plurality of parameters to select an optimal EAS of the plurality of EASs to communicate (e.g. context transfer) with a UE. Using the plurality of parameters to select the optimal EAS of the plurality of EASs, by a network entity, to communicate with the UE can provide needed QoS to the UE, resulting in high QoE to a user of the UE.

Embodiments of the disclosure determine, by a network entity, a notification order associated with each EAS of the plurality of EASs for context switching based on the ranking upon receiving a notification about a change in a DNAI. The notification about the change in the DNAI indicates that the UE moves from one MEC service area to another MEC service area. Furthermore, the notification about the change in the DNAI is received at an EES from a User Plane Function (UPF) and/or a Session Management Function (SMF) entity of a 5G MEC network (i.e. wireless network). The context switching based on the ranking improves the QoS for the UE, resulting in high QoE to the user of the UE.

Embodiments of the disclosure estimate, by a network entity, maximum throughput requirements of all data sessions associated with the UE(s) based on the plurality of parameters. The estimated maximum throughput requirements are sent to the UPF and/or the SMF entity of the 5G MEC network to optimize allocation of resources at the UPF and/or the SMF entity for the UE(s) to manage data sessions without deterioration of service (e.g. context switching) associated the UE(s).

Embodiments of the disclosure provide a method for performing a context switchover in a wireless network. According to an example embodiment, the method includes: identifying, by an edge network entity, a plurality of first parameters associated with a user equipment (UE) and a plurality of second parameters associated with the edge network entity. Further, the method includes receiving, by the edge network entity, a data path change notification from a session management entity. Further, the method includes determining, by the edge network entity, a ranking for each of a plurality of edge application servers (EASs) based on the plurality of first parameters and the plurality of second parameters, in response to reception of the data path change notification. Further, the method includes selecting, by the edge network entity, at least one target EAS of the plurality of EASs based on the ranking for each of the plurality of EASs, and performing, by the edge network entity, the context switchover to the at least one target EAS.

In an example embodiment, the edge network entity includes an Edge Configuration Server (ECS), an Edge Enabler Server (EES), and a plurality of EASs.

In an example embodiment, the plurality of first parameters includes one of a preference for the EAS selection pattern for a specific application of the UE or a type of an application of the UE.

In an example embodiment, the plurality of second parameters includes one of a required quality of service (QoS) at an edge configuration server (ECS), a current computing load of each of the plurality of EASs, a network load at each of the plurality of EASs, a network topology, key performance indicators (KPIs) of each of the plurality of EASs, an identity (ID) of each of the plurality of EASs, a type of each of the plurality of EASs, a service supported by each of the plurality of EASs, a maximum request rate processed by each of the plurality of EASs, an average response time at each of the plurality of EASs, or a number of UEs subscribed in each of the plurality of EASs.

In an example embodiment, the method includes identifying, by an edge network entity, a plurality of EAS services provided by the plurality of EASs. Further, the method includes receiving, by the edge network entity, from the UE, a request to access at least one EAS service of the plurality of EAS services. Further, the method includes ranking, by the edge network entity, each AS of the plurality of EASs based on a machine learning for obtaining a correlation of the plurality of first parameters and the plurality of second parameters.

In an example embodiment, the method includes: determining, by an edge network entity, one or more server parameters of the plurality of edge application servers and one or more network parameters of one or more UEs in connection with plurality of edge application servers. Further, the method includes generating, by the edge network entity, the ML engine by training using one or more server parameters and one or more network parameters. Further, the method includes detecting, by the edge network entity that one or more UEs in the wireless network is beginning to initiate a context switchover or an initial access. Further, the method includes applying, by the edge network entity, the at least one ML engine to rank the edge application servers for enabling the context switchover or the initial access (e.g., when one or more UEs discover an edge server to connect to in order to obtain the edge service, initial access is defined as the first time one or more UEs connects to the edge network after being disconnected).

In an example embodiment, the ECS of the edge network entity selects an optimal EAS of the plurality of EASs based on the ranking and the ECS of the edge network entity notifies the UE through the selected optimal EAS to access an EAS service of the plurality of EAS services associated with the selected optimal EAS.

In an example embodiment, the ECS of the edge network entity sends a plurality of optimal EASs based on the ranking and the ECS of the edge network entity notifies the plurality of optimal EASs to the UE, where the UE applies the ML engine on the plurality of optimal EASs to select an optimal EAS to access the EAS service of the plurality of EAS services associated with the selected optimal EAS.

In an example embodiment, determining, by the edge network entity, the EAS ranking notification order upon reception of the DNAI change notification from the SMF entity includes determining, by the edge network entity, the plurality of EAS services provided by the plurality of EASs, where the plurality of EAS services includes the plurality of EAS instances. Further, the method includes receiving, by the EES of the edge network entity, the DNAI change notification from the SMF entity. Further, the method includes determining, by the EES of the edge network entity, the EAS ranking notification order associated with the plurality of EASs by applying the ML engine on the plurality of parameters associated with the UE and the plurality of parameters associated with the edge network entity.

In an example embodiment, the UE is connected with the edge network entity, the UE receives the EAS service from the plurality of EASs, the EAS is registered with the EES to initiate the context switchover based on the ranking of each EAS, the EES is registered with the SMF entity for receiving the DNAI change notification, and the EES is trained with the ML engine.

In an example embodiment, the data path change notification indicates that the UE moves from one MEC service area to another MEC service area.

In an example embodiment, the method includes: obtaining, by an edge network entity, the plurality of third parameters from the UE, where the plurality of third parameters includes an identity ID of the UE, a type of application, a source internet protocol (IP), a destination IP, a source port, a destination port, a type of service, and a maximum throughput transferred to a user plane entity. Further, the method includes storing, by the edge network entity, the obtained plurality of third parameters. Further, the method includes estimating, by the edge network entity, maximum throughput requirements of data sessions associated with the UE by a machine learning based on the stored plurality of third parameters. Further, the method includes sending, by the edge network entity, the estimated maximum throughput requirements to one of the user plane entity or the session management entity.

In an example embodiment, the ML engine is trained by: receiving the plurality of parameters from a data collector of the EES, wherein the data collector receives the plurality of parameters from the UE through the 3GPP network and periodically transfers the data to the data processor of the at least one ML engine determining ranks of the EAS(s) by using the plurality of received parameters, and sending determined ranks of the EAS(s) to the EES and the ECS, wherein the EES and the ECS predict optimum parameters of the plurality of parameters for a current data session(s) of the UE to rank the EAS(s).

For example, preferences for a given UE are modelled as a pair of objects and input to the ML engine using RankSVM or XGBoost (or any other ranking algorithm) for classifying the order of pairs of objects and utilizing the classifier in the ranking task. Further, evaluation of the model/ML engine is performed by comparing the ranking results against results obtained by optimization mechanisms. The evaluation is performed using, for example, NDCG (Normalized Discounted Cumulative Gain), Spearman's ranking correlation coefficient and/or Kendall's Tau metrics and the ranking mechanisms loss function (the deviation between the ranking results and the ideal ranking values) is minimized using mechanisms similar to LambdaMART.

In an example embodiment, the method includes: determining, by an edge network entity, one or more server parameters of a plurality of edge application servers. Further, the method includes determining, by the edge network entity, one or more network parameters of one or more UEs connected with plurality of edge application servers. Further, the method includes generating, by the edge network entity, at least one Machine Learning (ML) engine including a correlation of one or more server parameters and one or more network parameters. Further, the method includes detecting, by the edge network entity, that one or more UEs in the wireless network is beginning to initiate a context switchover with one edge application server of the plurality of edge application servers. Further, the method includes applying, by the edge network entity, the at least one ML engine to rank the edge application servers for enabling the context switchover by the one or more UEs such that the edge application server with the highest rank offers the highest quality of service for the one or more UEs.

The one or more server parameters of the plurality of edge application servers according to an example embodiment includes: at least one of a required Quality of Service (QoS) at an Edge Configuration Server (ECS), a current computing load of the EAS, a network load at the EAS, a network topology, Key Performance Indicators (KPIs) of the EAS, an Identity (ID) of each EAS, a type of each EAS, a service supported by each EAS, a maximum request rate processed by each EAS, an average response time at each EAS, or a number of the UEsubscribed in each EAS. The one or more network parameters of one or more UEs includes at least one of a preference for a EAS selection pattern for a specific application of one or more UEs or a type of an application of one or more UEs.

Accordingly, the example embodiments herein provide the edge network entity for initiating the context switchover in the wireless network. The edge network entity includes a MEC controller coupled with a processor and a memory. The MEC controller is configured to identify the plurality of first parameters associated with the UE and the plurality of second parameters associated with the edge network entity. Further, the MEC controller is configured to receive a data path change notification from a session management entity. Further, the MEC controller is configured to determine a ranking for each of a plurality of edge application servers (EASs) based on the plurality of first parameters and the plurality of second parameters, in response to reception of the data path change notification. Further, the MEC controller is configured to select at least one target EAS of the plurality of EASs based on the ranking for each of the plurality of EASs, and performing the context switchover to the at least one target EAS.

Accordingly, example embodiments herein provide the UE for initiating the context switchover in the wireless network. The UE includes a MEC controller coupled with a processor and a memory. The MEC controller is configured to receive the plurality of optimal EASs based on the ranking from the edge network entity. Further, the MEC controller is configured to select the optimal EAS to access the EAS service(s) of the plurality of EAS services associated with the selected optimal EAS by applying the ML engine.

These and other aspects of the various example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the various example embodiments herein without departing from the spirit thereof, and the embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
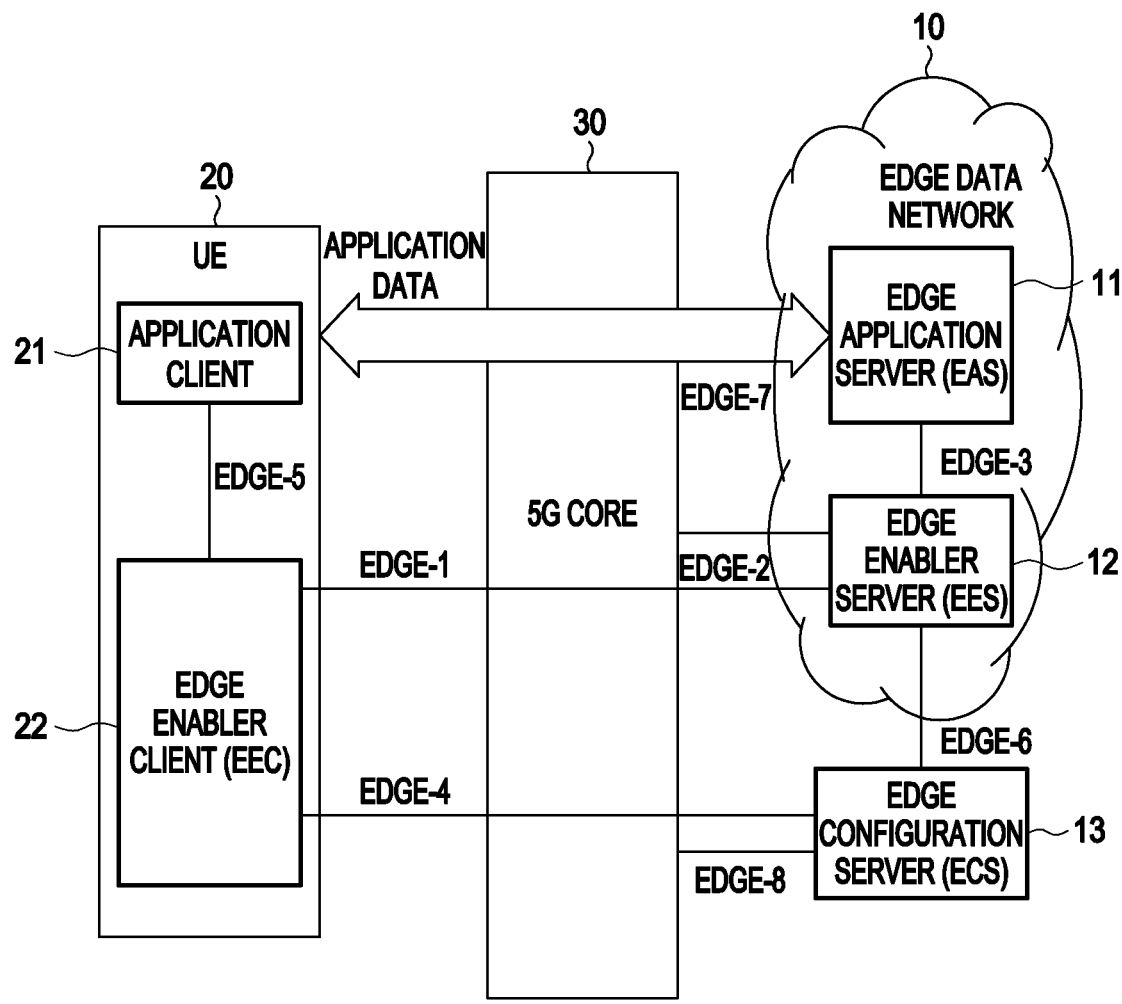
FIG. 1 is a block diagram of an existing 3GPP 5G-MEC architecture, according to a prior art disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Various example embodiments described herein provide a method for initiating a context switchover in a wireless network. The method includes determining, by an edge network entity, a plurality of parameters associated with a User Equipment (UE) and a plurality of parameters associated with the edge network entity. Further, the method includes receiving, by the edge network entity, a Data Network Access Identifier (DNAI) change notification from a Session Management Function (SMF) entity. Further, the method includes determining, by the edge network entity, an Edge Application Server (EAS) ranking notification order upon reception of the DNAI change notification from the SMF entity, wherein the EAS ranking notification order is determined by applying a Machine Learning (ML) model/engine on the plurality of parameters associated with the UE and the plurality of parameters associated with the edge network entity. Further, the method includes initiating, by the edge network entity, the context switchover based on the EAS ranking notification order.

Various example embodiments described herein provide an edge network entity for initiating a context switchover in a wireless network. The edge network entity may, for example, include an MEC controller coupled with a processor and a memory. The MEC controller is configured to determine the plurality of parameters associated with a UE and the plurality of parameters associated with the edge network entity. Further, the MEC controller may, for example, be configured to receive a DNAI change notification from an SMF entity. Further, the MEC controller may, for example, be configured to determine an EAS ranking notification order upon reception of the DNAI change notification from the SMF entity, wherein the EAS ranking notification order is determined by applying an ML engine on the plurality of parameters associated with the UE and the plurality of parameters associated with the edge network entity. Further, the MEC controller may, for example, be configured to initiate the context switchover based on the EAS ranking notification order.

Various example embodiments described herein provide a UE for initiating a context switchover in a wireless network. The UE may, for example, include an MEC controller coupled with a processor and a memory. The MEC controller may, for example, be configured to receive a plurality of EASs based on a ranking from the edge network entity. Further, the MEC controller may, for example, be configured to select an EAS to access the EAS service(s) of the plurality of EAS services associated with the selected EAS by applying an ML engine.

Figure 2A:
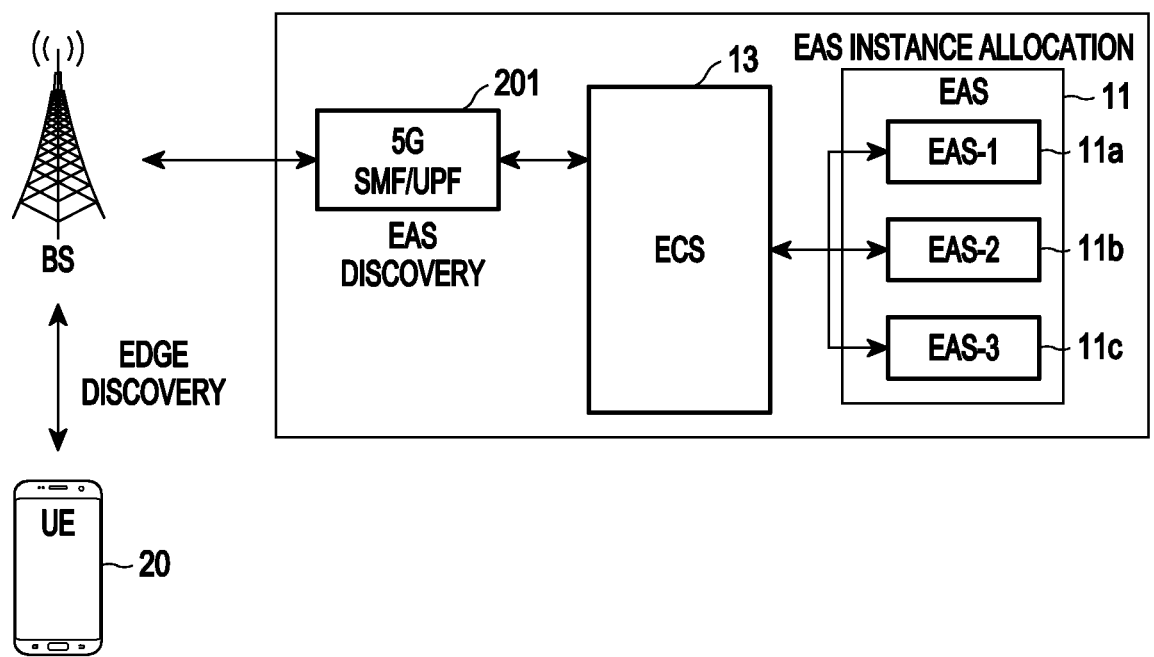
FIGS. 2A, 2B and 2C are diagrams illustrating example scenarios illustrating an edge discovery, a context switching, and resource allocation policies of a UPF/SMF entity in the existing 3GPP 5G-MEC architecture, according to a prior art disclosed herein.

For edge discovery in an existing 3GPP 5G-MEC architecture as shown in FIG. 2A, consider a situation in which streaming services, via a BS, are provided with three EAS instances (e.g., EAS-1 11a, EAS-2 11b, and EAS-3 11c). When a discovery request for the streaming services of the EAS 11 is received by an ECS 13 via 5G SMF/UPF 201, then the ECS 13 selects the EAS 11 (for example, EAS-1 11a and/or EAS-2 11b and/or EAS-3 11c) using static methods, whereas another EES (not shown in FIG. 2A) may select the EAS 11 instances using a round-robin methodology or a weight-based methodology after receiving the discovery request. However, the static methods are insufficient to provide a required QoS to the UE 20, resulting in a low QoE to a user of the UE 20.

Figure 2B:
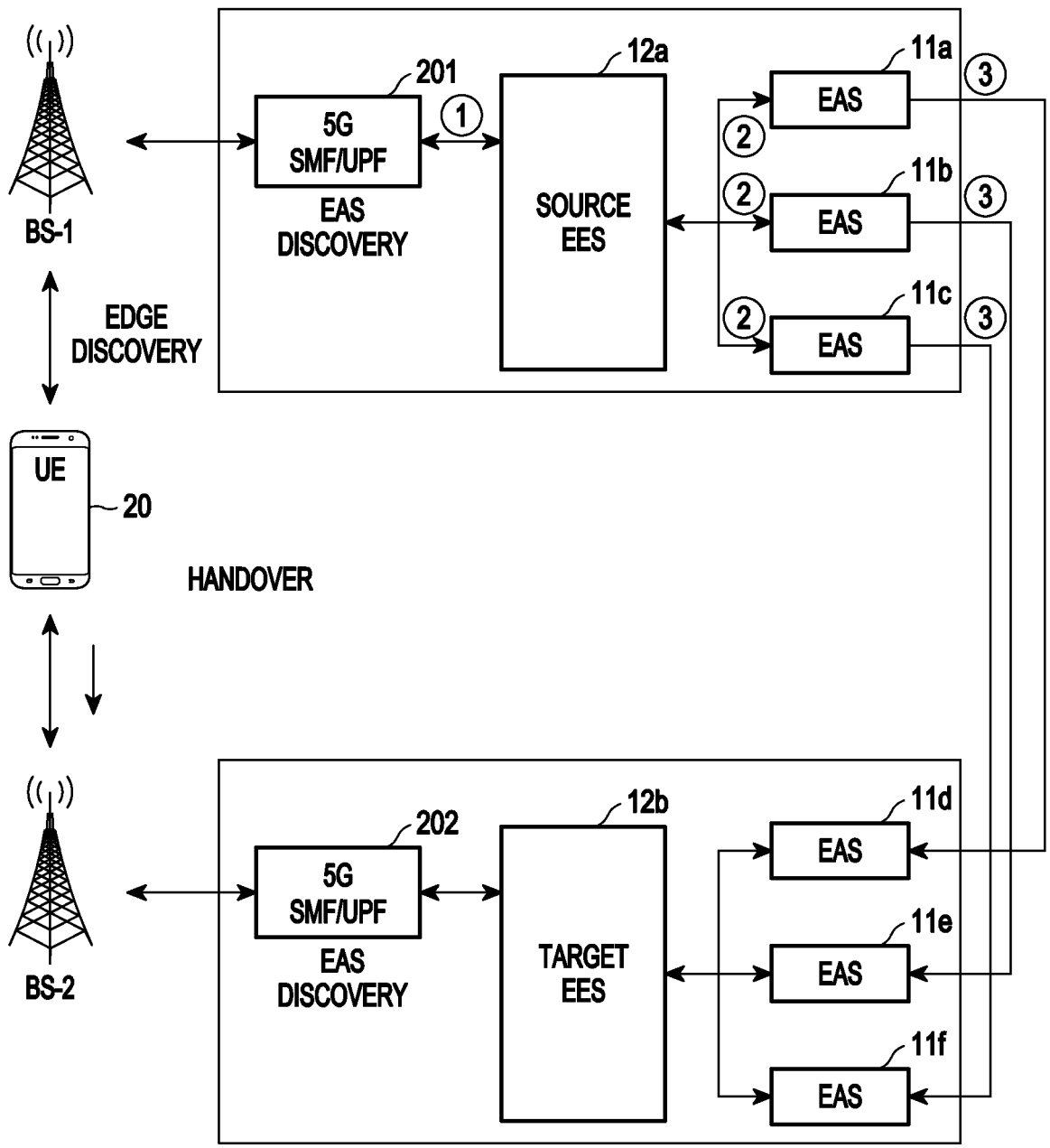

For context switching in the existing 3GPP 5G-MEC architecture as shown in FIG. 2B, consider a situation in which the streaming services, via a BS, are provided with three EAS services (e.g. EAS-1 11a for real-time communication, EAS-2 11b for streaming service, and EAS-3 11c for database service). Consider that a source EES 12a receives a DNAI change notification message from a 5G SMF/UPF core 201 regarding a change in a DNAI. Now context switchover need to be initiated from source EASs (11a, 11b and 11c) to target EASs (11d, 1 1e and 11f) to continue the service for the UE. To inform the source EAS 11 for context switchover, the source EES 12a uses static methods (for example, first notify the EAS that was connected to the UE 20 initially). The static methods may cause higher priority services to get late context switchover notification, delaying the context switchover procedure and affecting the QoE of the UE 20.

Figure 2C:
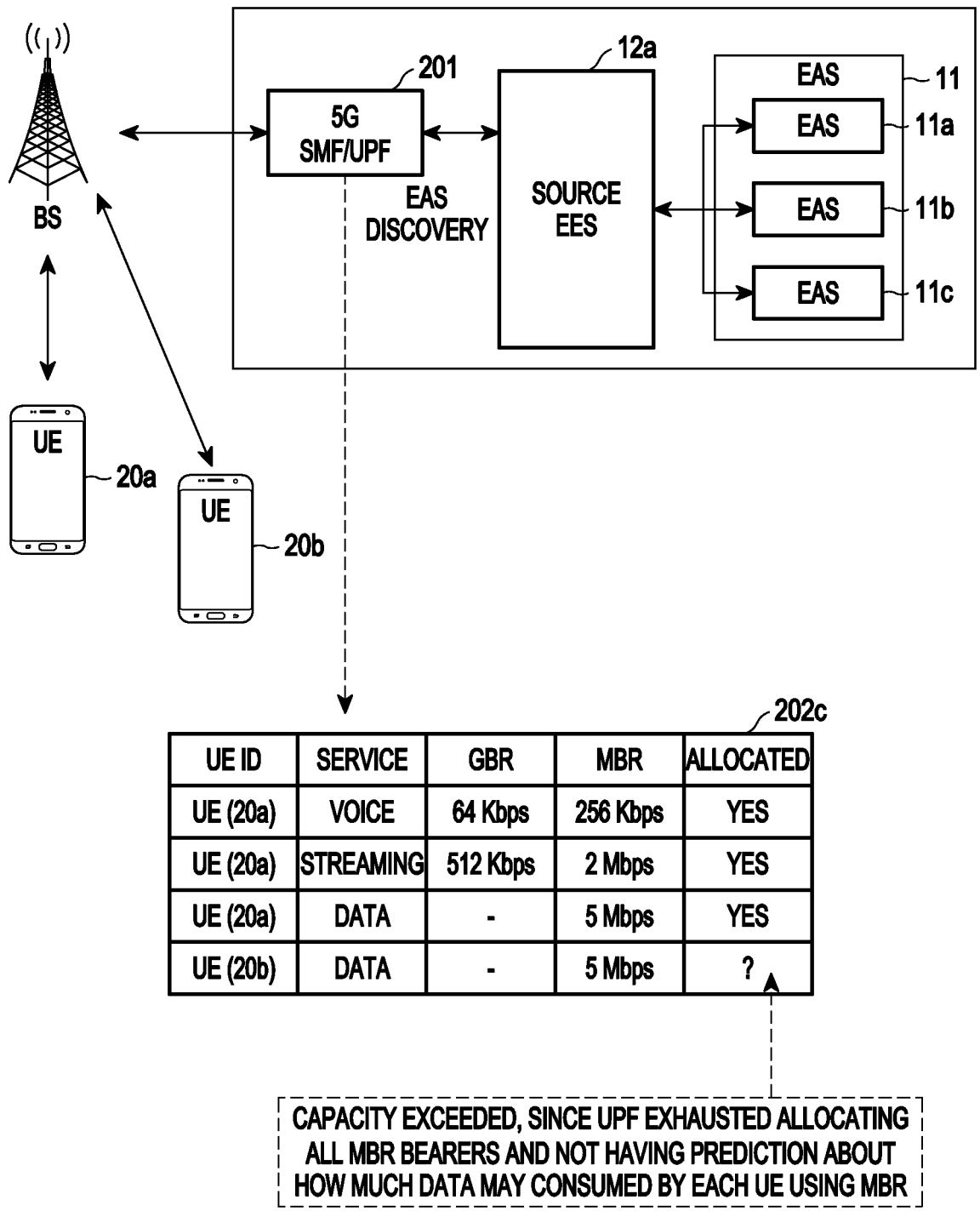

For resource allocation policies of the UPF/SMF entity in the existing 3GPP 5G-MEC architecture as shown in FIG. 2C, consider a situation in which a UE-1 20a is linked to the UPF 201 and employing three services 202c, such as two Guaranteed Bit Rate (GBR) and one Maximum Bit Rate (MBR). The allocation of resources is based on policies for three services. A UE-2 20b request for 1 MBR bearer may be made to the UPF 201. If the MBR resources at the UPF 201 are depleted, the UPF 201 may not be able to assign a bearer for the UE-2 20b) as the UPF 201 in the existing 3GPP 5G-MEC architecture does not estimate maximum throughput requirements of all data sessions associated with the UE(s), resulting in low QoE to the user of the UE-220b.

Unlike existing methods and systems, the example systems and methods disclosed herein can allow an edge network entity and a UE to rank each EAS of a plurality of EASs by applying an ML engine on the plurality of parameters to select one EAS of the plurality of EASs to communicate (e.g. context transfer) with the UE. The plurality of parameters is associated with the UE and the edge network entity (e.g. ECS, EES, EASs, etc.). By using the plurality of parameters to select one EAS of the plurality of EASs to communicate with the UE provides needed QoS to the UE, resulting in high QoE to a user of the UE.

Unlike existing methods and systems, the example systems and methods disclosed herein can allow an edge network entity and a UE to determine a notification order associated with each EAS of the plurality of EASs for context switching based on the ranking upon receiving a notification about the change in DNAI. The notification about the change in the DNAI may, for example, indicate that the UE moves from one MEC service area to another MEC service area and the notification about the change in the DNAI is received at an EES from a User Plane Function (UPF) and/or a Session Management Function (SMF) entity of a 5G MEC network. The context switching based on the ranking improves QoS for the UE, resulting in the high QoE to the user of the UE.

Unlike existing methods and systems, the example systems and methods disclosed herein can allow an edge network entity and a UE to estimate maximum throughput requirements of all data sessions associated with the UE(s) based on a plurality of parameters (e.g. an ID of the UE, a type of application, a source Internet Protocol (IP), a destination IP, a source port, a destination port, a type of service, and a maximum throughput transferred to the UPF, etc.) and send the estimated maximum throughput requirements to the UPF and/or the SMF entity of the 5G MEC network to improve the allocation of resources at the UPF and/or the SMF entity for the UE(s) to manage data sessions with reduced deterioration of service (e.g. context switching) associated with the UE(s).

Various example embodiments are disclosed with reference to the drawings and more particularly to FIGS. 3, 4, 5, 6, 7A, 7B, and 7C, in which similar reference characters denote corresponding features consistently throughout the figures.

Figure 3:
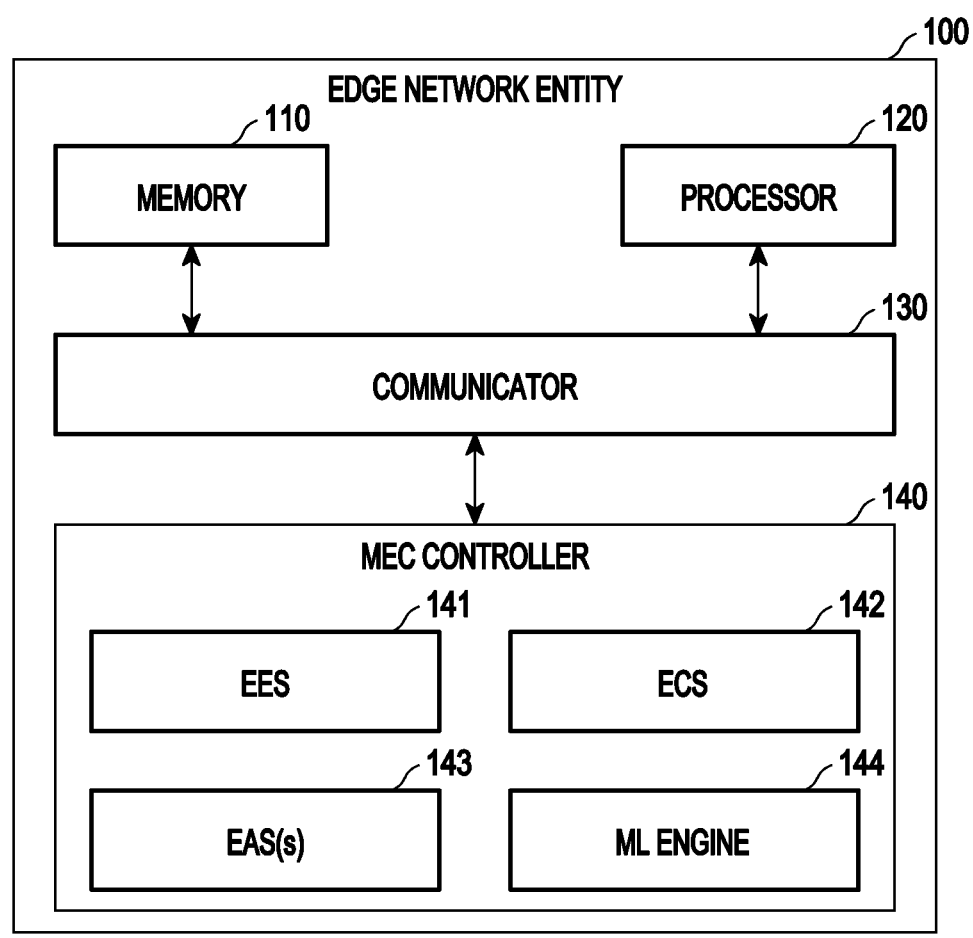
FIG. 3 is a block diagram illustrating an example configuration of an edge network entity for improving QoS during edge discovery, context switching, and resource allocation policies of a UPF/SMF entity in a 5G-MEC network, according to various embodiments.

FIG. 3 is a block diagram illustrating an example configuration of an edge network entity 100 for improving a QoS during edge discovery, context switching, and resource allocation policies of a UPF/SMF entity (e.g., UPF/SMF entity 601 shown in FIG. 6) in a 5G-MEC network (i.e. wireless network), according to various embodiments.

In various embodiments, the edge network entity 100 includes a memory 110, a processor 120, a communicator 130 including communication circuitry, and an MEC controller 140.

The memory 110 stores a plurality of parameters associated with a User Equipment (UE) 200 (shown in FIG. 4) and a plurality of parameters associated with the edge network entity 100. Examples of the plurality of parameters associated with the UE 200 include, but are not limited to, a preference for the EAS selection pattern for a specific application of the UE 200 and a type of an application of the UE 200. Examples of the plurality of parameters associated with the edge network entity 100 include, but are not limited to, a required Quality of Service (QoS) at an ECS 142, a current computing load of an EAS 143, a network load at the EAS 143, a network topology, Key Performance Indicators (KPIs) of the EAS 143, an Identity (ID) of each EAS, a type of each EAS 143, a service supported by each EAS 143, a maximum request rate processed by each EAS 143, an average response time at each EAS 143, and a number of the UE subscribed in each EAS 143.

Further, the memory 110 also stores instructions to be executed by the processor 120. The memory 110 may include non-volatile storage elements. Examples of such non-volatile storage elements include, but are not limited to, magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may, for example, indicate that the storage medium is not embodied in a carrier wave or a propagated signal. However, the term "non-transitory" should not be interpreted to mean the memory 110 is non-movable. In some examples, the memory 110 can be configured to store larger amounts of information. In certain examples, a non-transitory storage medium may store data that can, over time, change (e.g., in Random Access Memory (RAM) or cache). The memory 110 can be an internal storage unit or it can be an external storage unit of the edge network entity 100, a cloud storage, or any other type of external storage.

The processor 120 communicates with the memory 110, the communicator 130, and the MEC controller 140. The processor 120 is configured to execute instructions stored in the memory 110 and to perform various processes. The processor 120 may include one or a plurality of processors, may be a general-purpose processor, such as a central processing unit (CPU), an application processor (AP), or the like, a graphics-only processing unit such as a graphics processing unit (GPU), a visual processing unit (VPU), and/or an AI dedicated processor such as a neural processing unit (NPU).

The communicator 130 includes an electronic circuit specific to a standard that enables wired or wireless communication. The communicator 130 is configured for communicating internally between internal hardware components and with external devices via one or more networks.

In various embodiments, the MEC controller 140 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In various embodiments, the MEC controller 140 is configured to determine the plurality of parameters associated with the UE 200 and the plurality of parameters associated with the edge network entity 100. Further, the MEC controller 140 is configured to receive a Data Network Access Identifier (DNAI) change notification from a Session Management Function (SMF) entity 601 (shown in FIG. 6). Further, the MEC controller 140 is configured to determine an Edge Application Server (EAS) ranking notification order upon reception of the DNAI change notification from the SMF entity 601, where the EAS ranking notification order is determined by applying a Machine Learning (ML) model/engine 144 on the plurality of parameters associated with the UE 200 and the plurality of parameters associated with the edge network entity 100. Further, the MEC controller 140 is configured to initiate the context switchover based on the EAS ranking notification order.

Further, the MEC controller 140 is configured to determine a plurality of EAS services provided by the plurality of EASs 143, wherein the plurality of EAS services includes a plurality of EAS instances. Further, the MEC controller 140 is configured to receive a discovery request from the UE 200 to select an EAS of the plurality of EASs 143. Further, the MEC controller 140 is configured to rank each EAS 143 of the plurality of EASs 143 by applying the ML engine 144 on the plurality of parameters associated with the UE 200 and the plurality of parameters associated with the edge network entity 100.

Further, the MEC controller 140 is configured to select an EAS (e.g., highest-ranked or optimal) of the plurality of EASs 143 based on the ranking and notify the UE 200 through the selected EAS to access an EAS service of the plurality of EAS services associated with the selected EAS.

Further, the MEC controller 140 is configured to send a plurality of EASs based on the ranking and notify the plurality of EASs to the UE 200, where the UE 200 applies an ML engine 243 on the plurality of EASs to select the EAS to access the EAS service of the plurality of EAS services associated with the selected EAS.

Further, the MEC controller 140 is configured to determine a plurality of EAS services (e.g. voice call, video call, internet services, etc.) provided by the plurality of EASs 143, where the plurality of EAS services includes a plurality of EAS instances. Further, the MEC controller 140 is configured to receive the DNAI change notification from the SMF entity 601. Further, the MEC controller 140 is configured to determine the EAS ranking notification order associated with the plurality of EASs by applying the ML engine 144 on the plurality of parameters associated with the UE 200 and the plurality of parameters associated with the edge network entity 100.

Further, the MEC controller 140 is configured to obtain the plurality of parameters from the UE 200, where the plurality of parameters includes an ID of the UE 200, a type of application, a source Internet Protocol (IP), a destination IP, a source port, a destination port, a type of service, and a maximum throughput transferred to a UPF. Further, the MEC controller 140 is configured to store the obtained plurality of parameters. Further, the MEC controller 140 is configured to estimate maximum throughput requirements of all data sessions associated with the UE 200 by applying the ML engine 144 on the obtained plurality of parameters. Further, the MEC controller 140 is configured to send the estimated maximum throughput requirements to one of the UPF or the SMF entity 601 of the wireless network to optimize allocation of resources at the one of the UPF or the SMF entity 601 for the UE 200 to manage data sessions without deterioration of service.

In various embodiments, the MEC controller 140 includes the EES 141, the ECS 142, the EAS(s) 143, and the ML engine 144. Throughout this disclosure, the terms "the ML engine", "the ML model", and "AI engine" are used interchangeably and mean the same.

In various embodiments, the EES 141 determines the plurality of EAS services provided by the plurality of EASs 143, where the plurality of EAS services includes the plurality of EAS instances. Further, the EES 141 receives the DNAI change notification from the SMF entity 601. Further, the EES 141 determines the EAS ranking notification order associated with the plurality of EASs 143 by applying the ML engine 144 on the plurality of parameters associated with the UE 200 and the plurality of parameters associated with the edge network entity 100. The notification about the change in the DNAI indicates that the UE 200 moves from one MEC service area to another MEC service area. The notification about the change in the DNAI is received at the EES 141 from one of a User Plane Function (UPF) and the SMF entity 601 of the wireless network.

In various embodiments, the ECS 142 determines the plurality of EAS services provided by the plurality of EASs 143, where the plurality of EAS services includes the plurality of EAS instances. Further, the ECS 142 receives a discovery request from the UE 200 to select an EAS of the plurality of EASs 143. Further, the ECS 142 ranks each EAS 143 of the plurality of EASs 143 by applying the ML engine 144 on the plurality of parameters associated with the UE 200 and the plurality of parameters associated with the edge network entity 100.

Further, the ECS 142 selects an EAS (e.g., highest-ranking, optimal) of the plurality of EASs 143 based on the ranking and the ECS 142 of the edge network entity 100, and notifies the UE 200 through the selected EAS to access the EAS service of the plurality of EAS services associated with the selected EAS.

Further, the ECS 142 sends a plurality of EASs based on the ranking and the ECS 142 of the edge network entity 100, and notifies the plurality of optimal EASs to the UE 200, where the UE 200 applies the ML engine 243 on the plurality of EASs to select an EAS to access the EAS service of the plurality of EAS services associated with the selected EAS.

Further, the MEC controller 140 is configured to determine one or more server parameters of the plurality of EAS(s) 143 and one or more network parameters of one or more UEs 200 in connection with plurality of EAS(s) 143. Further, the MEC controller 140 is configured to generate at least one Machine Learning (ML) engine 144 by training using one or more server parameters and one or more network parameters. Further, the MEC controller 140 is configured to detect that one or more UEs 200 in the wireless network is beginning to initiate a context switchover or an initial access. Further, the MEC controller 140 is configured to apply the at least one ML engine 144 to rank the EAS(s) 143 for enabling the context switchover or the initial access.

Further, the MEC controller 140 is configured to determine one or more server parameters of a plurality of EAS(s) 143. Further, the MEC controller 140 is configured to determine one or more network parameters of one or more UEs 200 in connection with plurality of EAS(s) 143. Further, the MEC controller 140 is configured to generate the ML engine 144 including a correlation of one or more server parameters and one or more network parameters. Further, the MEC controller 140 is configured to detect that one or more UEs 200 in the wireless network is beginning to initiate a context switchover with one EAS of the plurality of EASs 143. Further, the MEC controller 140 is configured to apply the at least one ML engine 144 to rank the edge application servers 143 for enabling the context switchover by the one or more UEs 200 such that the edge application server with the highest rank offers the highest quality of service for the one or more UEs 200.

The one or more server parameters of the plurality of edge application servers 143 includes at least one of a required Quality of Service (QoS) at an Edge Configuration Server (ECS) 142, a current computing load of the EAS 143, a network load at the EAS 143, a network topology, Key Performance Indicators (KPIs) of the EAS 143, an Identity (ID) of each EAS 143, a type of each EAS 143, a service supported by each EAS 143, a maximum request rate processed by each EAS 143, an average response time at each EAS 143, a number of the UE 200 subscribed in each EAS 143. The one or more network parameters of one or more UEs 200 include at least one of a preference for a EAS selection pattern for a specific application of one or more UEs 200 or a type of an application of one or more UEs 200.

Although the FIG. 3 shows various hardware components of the edge network entity 100, it is to be understood that other embodiments are not limited to the components or arrangement shown in FIG. 3. In other embodiments, the edge network entity 100 may include fewer or more components. Further, the labels or names of the components are used only for illustrative purposes and do not limit the scope of the systems and methods disclosed herein. One or more components can be combined together to perform the same or substantially similar function to initiate the context switchover in the wireless network.

Figure 4:
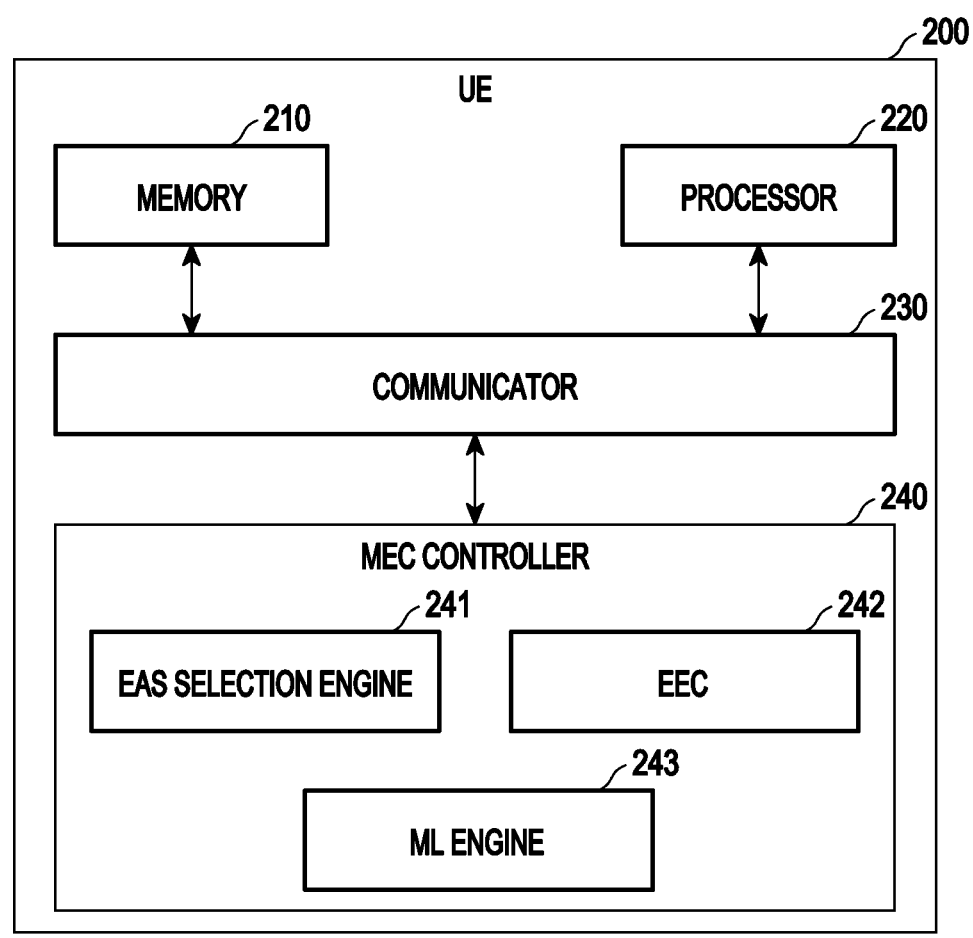
FIG. 4 is a block diagram illustrating an example configuration of a UE for improving the QoS during edge discovery, context switching, and resource allocation policies of a UPF/SMF entity in a 5G-MEC network, according to various embodiments.

FIG. 4 is a block diagram illustrating an example configuration of a UE 200 for improving the QoS during edge discovery, context switching, and resource allocation policies of a UPF/SMF (601) entity in a 5G-MEC network, according to various embodiments. Examples of the UE 200 include, but are not limited to, a smartphone, a tablet computer, a Personal Digital Assistance (PDA), an Internet of Things (IoT) device, a wearable device, a vehicle with wireless communication capability, a robotic device, etc.

In various embodiments, the UE 200 includes a memory 210, a processor 220, a communicator including communication circuitry 230, and an MEC controller 240.

The memory 210 stores a plurality of parameters associated with the UE 200. Examples of the plurality of parameters associated with the UE include, but are not limited to, the preference for the EAS selection pattern for the specific application of the UE 200 and the type of an application of the UE 200. Further, the memory 210 also stores instructions to be executed by the processor 220. The memory 210 may include non-volatile storage elements. Examples of such non-volatile storage elements may include, but are not limited to, magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may, for example, indicate that the storage medium is not embodied in a carrier wave or a propagated signal. However, the term "non-transitory" should not be interpreted to mean that the memory 210 is non-movable. In some examples, the memory 210 can be configured to store larger amounts of information. In certain examples, a non-transitory storage medium may store data that can, over time, change (e.g., in Random Access Memory (RAM) or cache). The memory 210 can be an internal storage unit or it can be an external storage unit of the UE 200, a cloud storage, or any other type of external storage.

The processor 220 communicates with the memory 210, the communicator 230, and the MEC controller 240. The processor 220 is configured to execute instructions stored in the memory 210 and to perform various processes. The processor 220 may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an AI dedicated processor such as a neural processing unit (NPU).

The communicator 230 includes an electronic circuit specific to a standard that enables wired or wireless communication. The communicator 230 is configured for communicating internally between internal hardware components and with external devices via one or more networks.

In various embodiments, the MEC controller 240 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In various embodiments, the MEC controller 240 includes an EAS selection engine 241, an EEC 242, and an ML engine 243. The EEC 242 of the UE 200 also has a light version of the EAS selection engine 241. The light version represents a minimalistic version of AI engine in UE which may run the EAS ranking algorithm on a selected set of EAS servers and select one out of the set. The EAS selection engine 241 (classifier) is utilized to select EAS(s) 143 based on historical service times by using the ML engine 243. After selecting the EAS(s) 143, the EEC 242 initiates a protocol data unit (PDU) session with the intermediary UPF/SMF entity 601 and transfers data with the EAS(s) 143.

Although the FIG. 4 shows various hardware components of the UE 200, it is to be understood that other embodiments are not limited thereon. In such other embodiments, the UE 200 may include fewer or more components. Further, the labels or names of the components are used only for illustrative purposes and do not limit the scope of the disclosed systems and methods. One or more components can be combined together to perform the same or substantially similar function to initiate the context switchover in the wireless network.

At least one of the plurality of modules/components of the FIG. 3 and FIG. 4, as mentioned above, maybe implemented through an Artificial Intelligence (AI) engine 144, 243. A function associated with the AI engine 144, 243 may be performed through memory 110 and 210 and the processors 120 and 220. One or a plurality of processors may control the processing of the input data in accordance with a predefined operating rule or the AI engine 144, 243 stored in the non-volatile memory and the volatile memory. The predefined operating rule or artificial intelligence model is provided through training or learning.

Here, being provided through learning refers to, for example, that, by applying a learning process to a plurality of learning data, a predefined operating rule or the AI engine 144, 243 of the desired characteristic is made. The learning may be performed in the edge network entity 100 and/or the UE 200 itself in which AI engine 144, 243 according to various embodiments is provided, and/or maybe implemented through a separate server/system.

The AI engine 144, 243 may include of a plurality of neural network layers. Each layer has a plurality of weight values and performs a layer operation through calculation of a previous layer and an operation of a plurality of weights. Examples of neural networks include, but are not limited to, convolutional neural networks (CNNs), deep neural networks (DNNs), recurrent neural networks (RNNs), restricted Boltzmann Machines (RBMs), deep belief networks (DBNs), bidirectional recurrent deep neural networks (BRDNNs), generative adversarial networks (GANs), and deep Q-networks.

The learning process may, for example, refer to a method for training a predetermined target device (for example, a robot, IoT device(s)) using a plurality of learning data to cause, allow, and/or control the target device to make a determination or prediction. Examples of learning processes include, but are not limited to, supervised learning, unsupervised learning, semi-supervised learning, and/or reinforcement learning.

In various embodiments, when compared to a linear allocation mechanism (e.g., methods in the existing 3GPP 5G-MEC architecture), the complexity of ranking the EAS 143 is lowered to a constant time using learning models of the AI engine 144, 243. A mechanism for learning to rank is divided into the following categories, which are categorized as pointwise, pairwise, and listwise. In the pointwise categorization, ranking problems are visualized as regression or classification on a single data entry. This enables the ranking mechanism to use existing regression or classification mechanism(s) and is modeled to label single objects. In the pairwise categorization, the ranking problem is transformed into regression or classification on object pairs, which can model the preferences within pair of objects. In the listwise categorization, ranking lists as instances in both learning and prediction and can optimize the per list loss function directly.

In one example, the AI engine 144, 243 uses learning methods such as Modeled Reinforcement Learning (Markov Decision Process), SVM Rank, and/or XGBoost Random Forest models to rank the EAS 143. To solve a problem/rank the EAS 143, the learning methods use a three-stage process. At a first-stage, the problem is considered as a convex or non-convex optimization problem, then a sub-optimal solution is iteratively identified using cost minimization methods. In a second stage, the MEC controller 140, 240 applies the learning methods to a dataset (whose structure is discussed below) to obtain a labeled dataset. In a third stage, to fit the dataset into the ranking SVM, a learning-based ranking method is used. The trained model can now rank the EAS 143 in real-time.

In various embodiments, evaluation of the learning method sis performed by testing the ranking of models (learning methods) against the results provided by an optimization method. Several evaluation metrics can be used such as Normalized Discounted Cumulative Gain (NDCG), Mean Average Precision (MAP), and/or Kendall's Tau.

In one example, the AI engine 144, 243 uses Rank SVM and XG Boost to learn a weight to assign for each feature. When Test queries are inputted to the AI engine 144, 243, we get score as an output which is a real number. which is a real number. The EAS servers are then ranked according to this score. A data processor of the AI engine 144, 243 is used to collect the data and transform it into the required structure to train the model. The collected data may include the plurality of parameters associated with the edge network entity. The collected data is fed to the AI engine 144, 243 so that the MEC controller 140, 240 may be updated periodically. The updated MEC controller 140/the MEC controller 240 is then used by the EES 141 at runtime to rank the EAS 143. The AI engine 144, 243 may be deployed as an independent module depending on system resources allocated for the EES 141.

In one non-limiting example, for SVM rank, training data is given as {((x (1) i, x (2) i), yi)}, where i=1, 2 up to m, where each instance includes two feature vectors (x (1) i, x (2) i) and a label yi∈ {+1, −1} denoting which feature vector should be ranked ahead, +1 denoting x (1) should be ranked first and vice versa. This method of ranking is called the pairwise ranking approach in which ranking is transferred into a pairwise classification or pairwise regression. Once the AI engine 144, 243 is trained against the training set, it is cross-validated against the test set and evaluated using Kendall's Tau metrics. In a real system, the AI engine 144, 243 training (which takes significant computer resources) can be done offline and ranking can be done online in real (or near-real) time.

In one non-limiting example, for XGBoost, rather than training all of the models in isolation of one another, boosting trains models in succession, with each new model being trained to correct the errors made by previous ones. The models are added sequentially until no further improvements can be made. The advantage of this iterative approach is that the new models being added are focused on correcting mistakes which were caused by other models. In a standard ensemble method in which models are trained in isolation, all of the models might simply end up making the same errors. Gradient Boosting specifically is, for example, an approach in which new models are trained to predict the residuals (i.e. errors) of prior models. XGBoost uses the LambdaMART ranking mechanism (for boosted trees), which uses the pair wise-ranking approach to minimize pairwise loss by sampling many pairs.

In one non-limiting example, Kendall's Rank Correlation coefficient, in which Kendall's Tau, also known as Kendall's rank correlation coefficient, is an evaluation metric to compare two rank results. Suppose $r_1$ and $r_2$ are two sets obtained from a model trained to learn to rank mode over the dataset, the Kendall's Tau between $r_1$ and $r_2$ is set forth in equation 1.

$$\tau(r_1, r_2) = \frac{P-Q}{P+Q} = 1 - \frac{2Q}{P+Q}, \quad (1)$$

where P is the number of concordant pairs and Q is the number of discordant pairs. A pair $(d_i, d_j)$ is said to be concordant if $r_1$ and $r_2$ rank $(d_i, d_j)$ in the same order. It is discordant if their orders are different.

In one non-limiting example, Spearman's Rank Correlation Coefficient, in which Spearman rank correlation is a non-parametric metric that gives the degree of association between two variables, in this case, the association between the result of the static mechanism and the predictions of the learning mechanism. The following formula (2) may be used to calculate the Spearman rank correlation:

$$\rho = 1 - \frac{6\Sigma d_i^2}{n(n^2-1)}, \quad (2)$$

where 'ρ' is Spearman rank correlation, '$d_i$' is the difference between the ranks and n is the number of observations.

Figure 5:
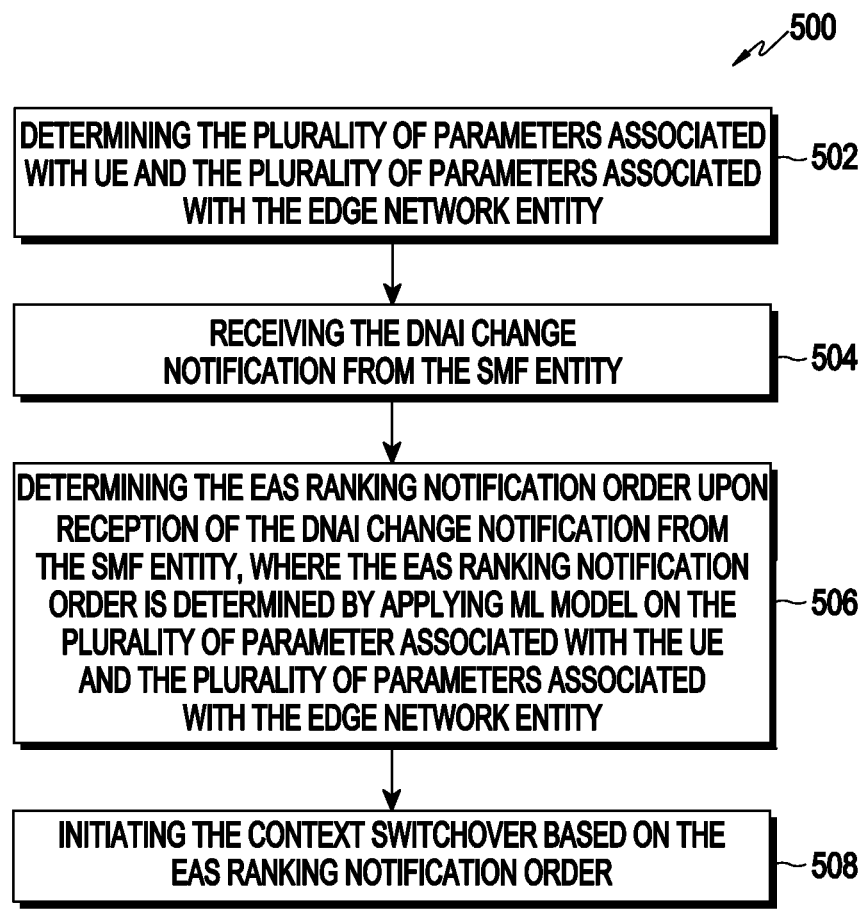
FIG. 5 is a flowchart illustrating an example method for improving the QoS during the edge discovery, the context switching, and the resource allocation policies of the UPF/SMF entity in the proposed 5G-MEC network, according to various embodiments.

FIG. 5 is a flowchart illustrating an example method for improving the QoS during the edge discovery, the context switching, and the resource allocation policies of a UPF/SMF entity in a 5G-MEC network, according to various embodiments. The operations 502-508 of the flowchart 500 are performed by an edge network entity 100.

At 502, the method includes determining the plurality of parameters associated with the UE 200 and the plurality of parameters associated with the edge network entity 100. At 504, the method includes receiving the DNAI change notification from the SMF entity 601. At 506, the method includes determining the EAS ranking notification order upon reception of the DNAI change notification from the SMF entity 601, where the EAS ranking notification order is determined by applying the ML engine 144 on the plurality of parameters associated with the UE 200 and the plurality of parameters associated with the edge network entity 100. At 508, the method includes initiating the context switchover based on the EAS ranking notification order.

The various actions, acts, blocks, steps, or the like in the flowchart 500 may be performed in the order presented, in a different order, or simultaneously. Further, in various embodiments, some of the actions, acts, blocks, steps, or the like may be omitted, added, modified, skipped, or the like without departing from the scope of the systems and method disclosed herein.

Figure 6:
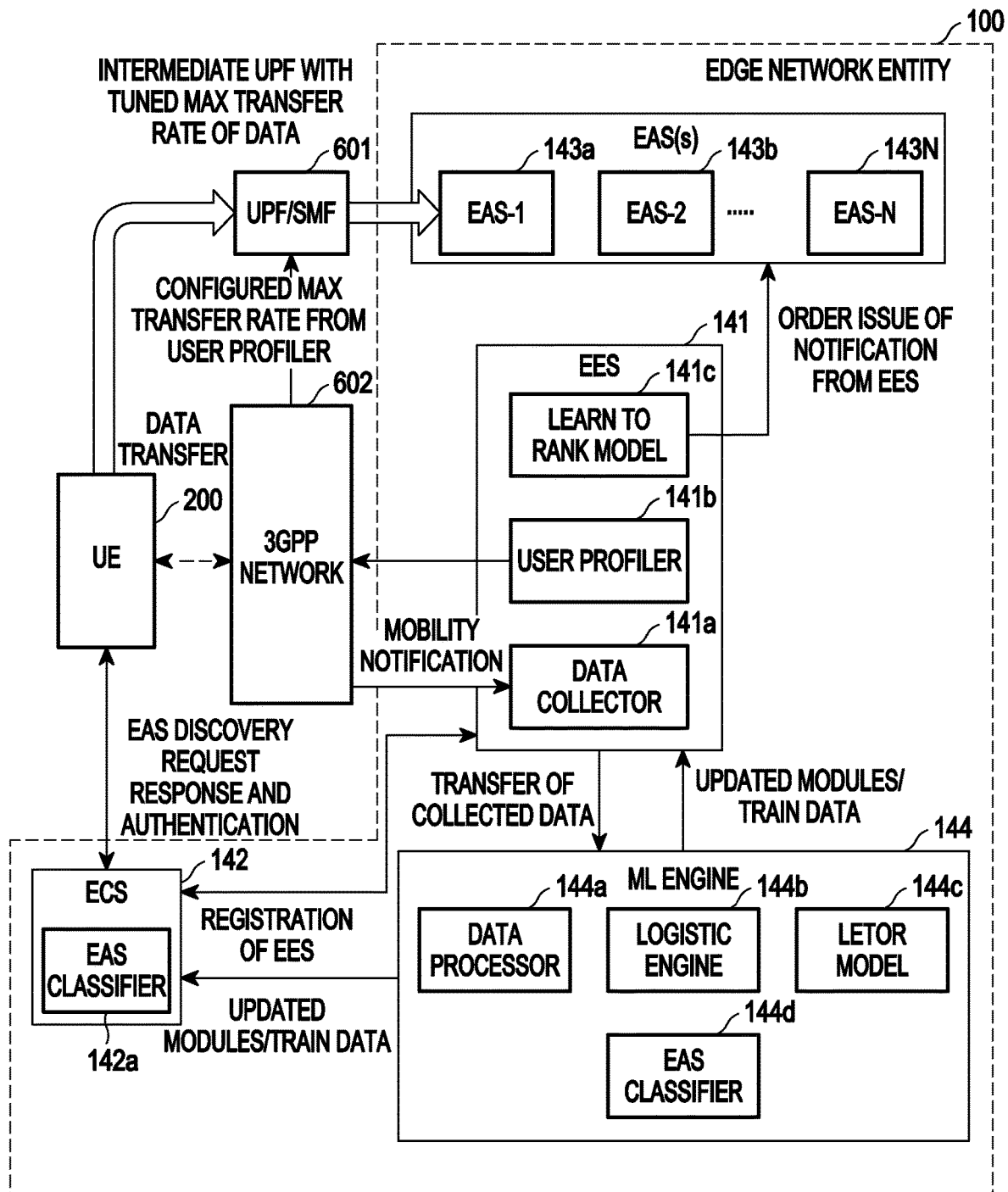
FIG. 6 is a block diagram illustrating an example architecture of a 5G-MEC network, according to various embodiments.

FIG. 6 is a block diagram illustrating an example architecture of a 5G-MEC network, according to various embodiments.

In various embodiments, the architecture of the 5G-MEC network includes the UE 200, the edge network entity 100, the UPF 601, and a 3GPP network 602. Furthermore, the edge network entity 100 includes the EES 141, the ECS 142, the EAS(s) 143, and the AI engine 144, 243. Furthermore, the EES 141 includes a data collector 141a, a user profiler 141b, and a Learn to rank model (LETOR) model 141c. Furthermore, the ECS 142 includes an EAS classifier 142a. Furthermore, the ML engine 144 includes a data processor 144a, a logistic engine 144b (e.g. logistic regression-based user profiler), a LETOR model 144c, and an EAS classifier 144d.

The data collector 141a receives the data (e.g. EAS allocation, UE ID, type of application) from the UE 200 through the 3GPP network 602 and periodically transfers the data to the data processor 144a. The logistic engine 144b, the LETOR model 144c, and the EAS classifier 144d use the received data for training and determining the ranks of the EAS(s) 143. The ML engine 144 transfers trained data to the EES 141 and the ECS 142.

The user profiler 141 band the LETOR model 141c receive the training data from the ML engine 144. The user profiler 141 buses the training data to predict parameters (e.g., optimum parameters) for the current data session(s) of the user of the UE 200. Further, the user profiler 141b sends the predicted parameters to the UPF 601 via the 3GPP network 602. The LETOR model 141c uses the training data to predict the rank of the EAS(s) 143. Further, the LETOR model 141c sends mobility notification (i.e. notification order of the EAS(s) 143) to the EAS(s) 143 based on the predicted ranking of the EAS(s) 143.

The ECS 142, like the EES 141, contains an EAS selection classifier 142a that ranks the top EAS(s) 143 that the EEC 141 can connect to after discovery. This is accomplished at the ECS 142, by collecting network topology data, traffic congestion, and historical service times of various EAS(s) 143, as well as its anticipated service time. The ECS 142 sends this data to the EES 141, where it is converted and mixed with EES 141 traffic data before being delivered to the ML engine 144 (learning module). The learning module offline updates the EAS selection classifier 144d and returns a new model to the ECS 142.

The EEC 242 of the UE 200 also has a light version of the EAS selection engine 241. The light version represents a minimalistic version of AI engine in UE which may run the EAS ranking algorithm on a selected set of EAS servers and select one out of the set. The EAS selection engine 241 (classifier) is utilized to select EAS(s) 143 based on historical service times. After selecting the best possible EAS(s) 143, the EEC 242 initiates the PDU session with the intermediary UPF 601 and transfers data with the EAS(s) 143.

Figure 7A:
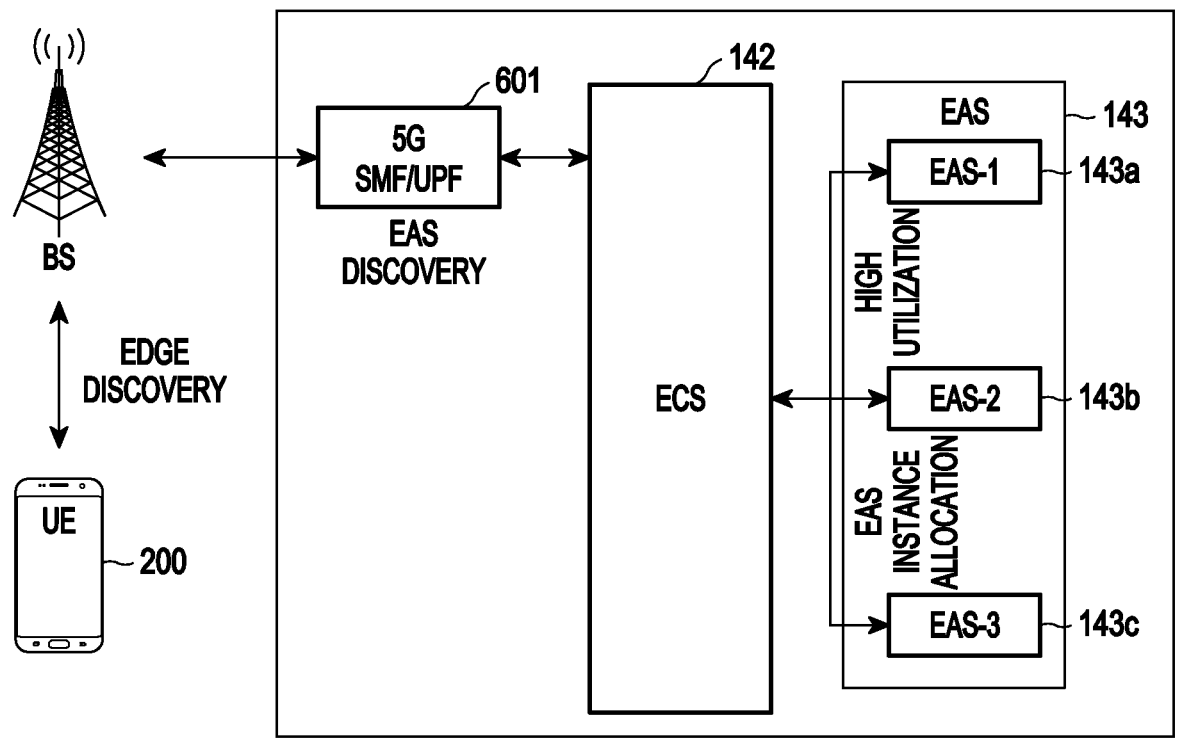
FIGS. 7A, 7B and 7C are diagrams illustrating example scenarios for edge discovery, context switching, and resource allocation policies of the UPF/SMF entity in a 5G-MEC architecture, according to various embodiments.
Figure 7B:
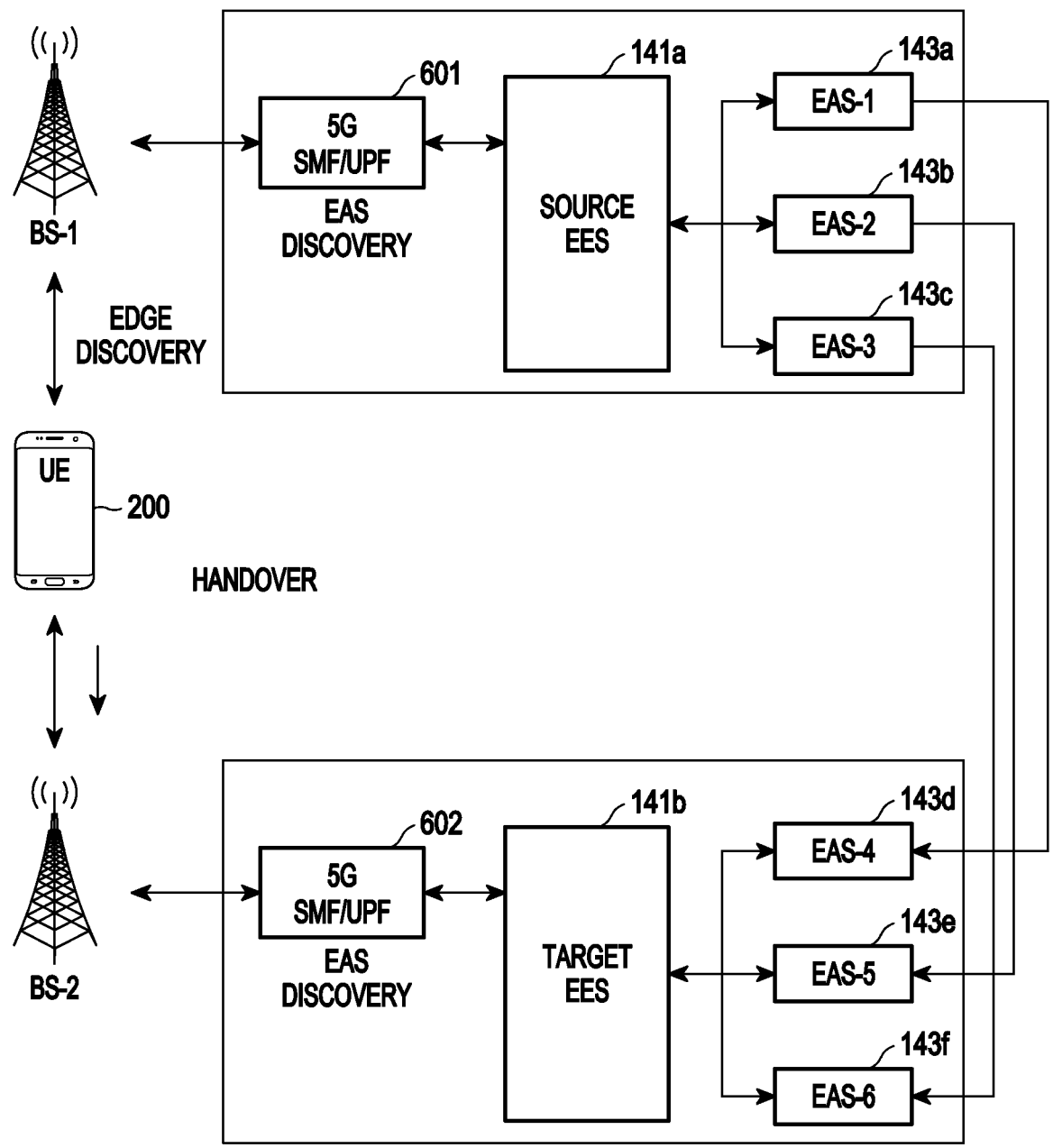
Figure 7C:
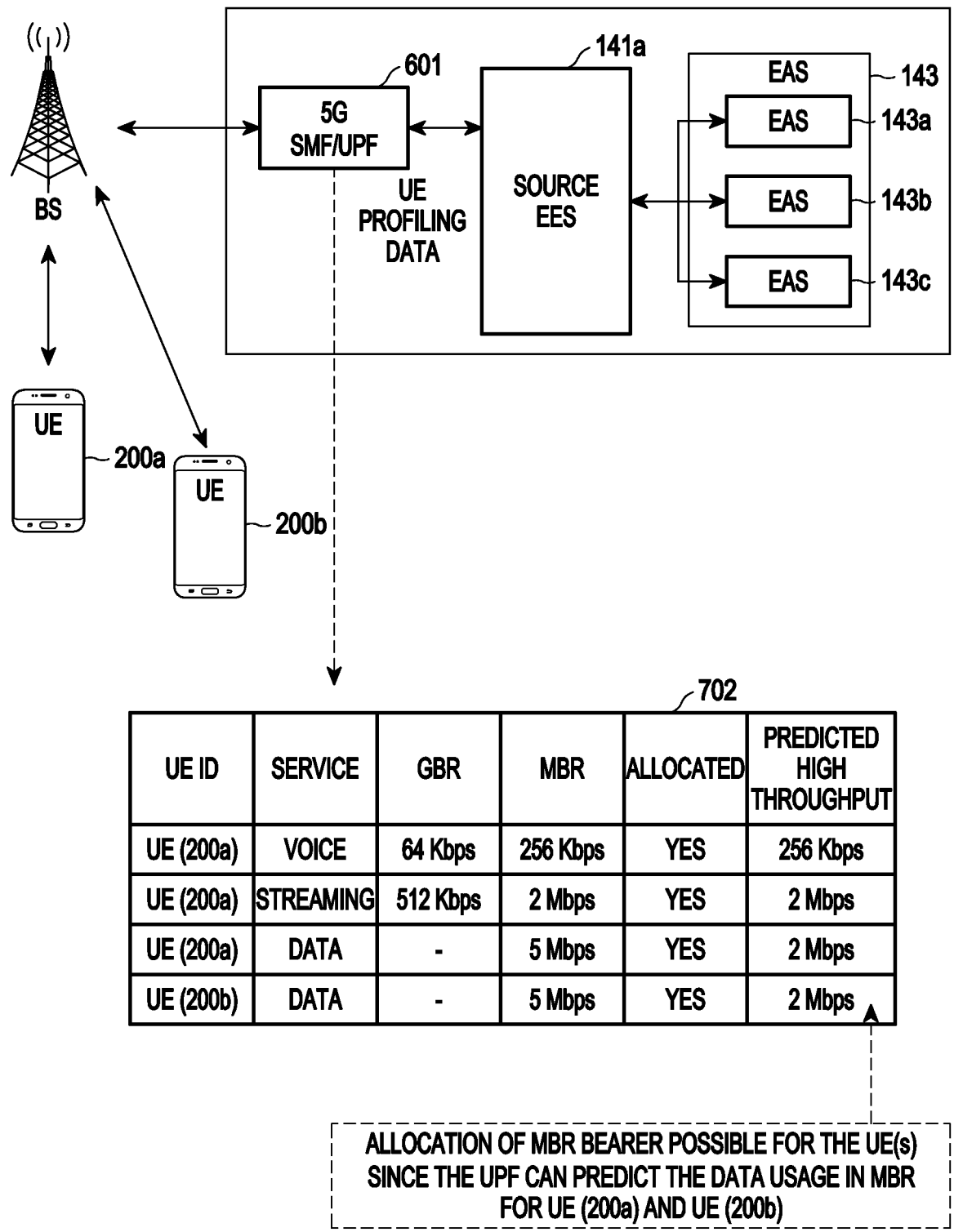

FIGS. 7A, 7B, and 7C are diagrams illustrating example scenarios for edge discovery, context switching, and resource allocation policies of the UPF/SMF entity in an 5G-MEC architecture, according to various embodiments.

For the edge discovery in the 5G-MEC architecture as shown in FIG. 7A, consider a situation in which streaming services are provided with three EAS instances (e.g. EAS-1 143a, EAS-2 143b, and EAS-3 143c). Initial conditions for the edge discovery are given below:
  i. The ECS 142 having information about an edge network topology, load conditions of the EAS(s) 143, KPIs of the EAS(s) 143, and the network load conditions.
  ii. The ECS 142 is trained using the AI engine 144 with data associated with the UE 200.

Consider the discovery request for the streaming services for selection of the EAS 143 is received by the ECS 142 from the UE 200. Upon receiving the discovery request, the ECS 142 applies ranking method(s) (e.g. RankSVM, XGBoost, etc.) on the data collected from the UE 200 and the edge network entity 100 using the ML engine 144 to order/rank EAS 143 (the plurality of EASs). The data includes the preference for the EAS selection pattern for the specific application of the UE, the type of the application of the UE 200, the required QoS at the ECS 142, the current computing load of the EAS 143, the network load at the EAS 143, the network topology, and the KPIs of the EAS 143.

Furthermore, the ECS 142 selects one EAS (e.g. 143a or 143b or 143c) from the plurality of the EAS 143 based on the applied ranking method(s) and informs the UE 200 about the selected EAS (e.g. 143a or 143b or 143c). Furthermore, the ECS 142 may send top-n EAS instead of sending the one EAS (e.g. 143a or 143b or 143c) from the plurality of the EASs 143. The UE 200 applies ranking method(s) by the MEC controller 240 and selects the one EAS (e.g. 143a or 143b or 143c) from the plurality of the EAS 143. The proposed method is sufficient to provide the needed QoS to the UE 200, resulting in high QoE to the user of the UE 200.

For the context switching in the 5G-MEC architecture as shown in FIG. 7B, consider a situation in which streaming services are provided with three EAS services (e.g. EAS-1 143a for real-time communication, EAS-2 143b for streaming service, and EAS-3 143c for database service). Initial conditions for the context switching are given below:
  i. The UE 200 is connected to the edge network (i.e. the source EES 141a and the EAS (143)).
  ii. The UE 200 is getting service(s) from several EAS 143 (i.e. EAS(s) 143).
  iii. The EAS(s) 143 are registered with the EES 141 for getting notification for the context switchover.
  iv. The source EES 141a is registered with the 5G SMF/UPF entity 601 for receiving DNAI change notification.
  v. The source EES 141a is trained using the ML engine 144 with the data associated with the UE 200.

The source EES 141a receives the DNAI change notification from 5G SMF/UPF entity 601. Upon reception of the DNAI change notification from 5G SMF/UPF entity 601 to the source EES 141a, the UE context need to be switched from source EAS 143a, 143b and 143c to target EAS 143d, 143e and 143f to continue the edge service for the UE 200. Target EAS 143d, 143e and 143f are connected to target EES 141b, and target EES 141b is connected to target SMF/UPF 602.

The UE 200 gets various EAS services from several EAS servers (i.e. EAS-1 143a, EAS-2 143b, and EAS-3 143c) from the BS-1, respectively. The several EAS servers are ranked by the source EES 141a. For example, the EAS-1 143a, has a higher priority, the EAS-2 143b has a medium priority, and the EAS-3 143c has a low priority. Based on this priority context switch over occurs when the UE 200 moves from the BS-1 to BS-2. For example, the EAS-1 143a switches to EAS-4 143d, EAS-2 143b switches to EAS-5 143e, and EAS-3 143c switches to EAS-6 143f, respectively.

Source EES 141a may receive the notification from a 5G core (3GPP network 602) regarding the change in the DNAI. To inform the EASs 143 about the context switchover, the source EES 144a uses ranking method(s)) (e.g. RankSVM, XGBoost, etc.) on data collected from the UE 200 and the edge network entity 100 using the ML engine 144 to order/rank EASs 143. The data includes the preference for the EAS selection pattern for the specific application of the UE, the type of the application of the UE 200, the required QoS of the UE 200, the current computing load of the EAS 143, the network load at the EAS 143, the network topology, the KPIs of the EAS 143, the ID of each EAS 143, the type of each EAS 143, the service supported by each EAS 143, the maximum request rate processed by each EAS 143, the average response time at each EAS 143, the number of the UE 200 subscribed in the each EAS 143.

The source EES 141a starts sending the notification to trigger the context switchover to the EAS 143 based on the ranking of the EAS(s) 143. This may result in higher priority services getting an early notification for the switchover, and increase the speed of the context switchover process, resulting in the needed QoS to the UE 200 and the high QoE to the user of the UE 200.

For the resource allocation policies of the UPF/SMF entity 601 in the 5G-MEC architecture shown in FIG. 7C, consider a situation in which the UE 200a is linked to the UPF 601 and employs three services 702, such as two GBR and one MBR. The allocation of resources is based on policies for the three services. Initial conditions for the resource allocation are given below:

i. The EAS 143 obtains the data (UE ID, type of application, data filters, the source IP, the destination IP, the source port, the destination port and the type of service) with maximum throughput (i.e maximum bit per second traffic encountered for the UE when using this specific edge service identified with parameters (UE ID, type of application, data filters, the source IP, the destination IP, the source port, the destination port and the type of service)), is transferred the obtained data to the UPF 601 (via SMF entity 601), stores the obtained data at the UPF 601, and transfers the obtained data to the EES 141. Further, the EES 141 stores the obtained data.

The UE 200b request for 1 MBR bearer is made to the UPF 601. The UPF 601 uses the obtained data to estimate maximum throughput requirements of all data sessions and hence the UPF 601 can accurately estimate how much capacity is left for allocation to new MBR requests. This information is used, by the UPF 601, when a new MBR request is received by the UPF, and as a result the UPF 601 can manage data resources efficiently, resulting in the high QoE to the user of the UE 200b.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for performing a context switchover in a wireless network, the method comprising:
    identifying, by an edge network entity, a plurality of first parameters associated with a user equipment (UE) and a plurality of second parameters associated with the edge network entity;
    receiving, by the edge network entity, a data path change notification of the UE from a session management entity;
    determining, by the edge network entity, a ranking for each of a plurality of edge application servers (EASs) based on the plurality of first parameters and the plurality of second parameters, in response to reception of the data path change notification;
    selecting, by the edge network entity, at least one target EAS of the plurality of EASs based on the ranking for each of the plurality of EASs; and
    performing, by the edge network entity, the context switchover to the at least one target EAS,
    wherein the ranking for each of the plurality of EASs is determined based on a machine learning for obtaining a correlation of the plurality of first parameters and the plurality of second parameters.

2. The method of claim 1, wherein the plurality of first parameters comprises at least one of a preference for an EAS selection pattern for a specific application of the UE or a type of an application of the UE.

3. The method of claim 1, wherein the plurality of second parameters comprises at least one of a required quality of service (QOS) at an edge configuration server (ECS), a current computing load of each of the plurality of EASs, a network load at each of the plurality of EASs, a network topology, key performance indicators (KPIs) of each of the plurality of EASs, an identity (ID) of each of the plurality of EASs, a type of each of the plurality of EASs, a service supported by each of the plurality of EASs, a maximum request rate processed by each of the plurality of EASs, an average response time at each of the plurality of EASs, or a number of UEs subscribed in each of the plurality of EASs.

4. The method of claim 1, further comprising:
    identifying, by the edge network entity, a plurality of EAS services provided by the plurality of EASs;
    receiving, by the edge network entity, from the UE, a request to access at least one EAS service of the plurality of EAS services;
    ranking, by the edge network entity, each of the plurality of EASs based on athe machine learning for obtaining athe correlation of the plurality of first parameters and the plurality of second parameters;
    selecting an EAS that provides the at least one EAS service among the plurality of EASs based on the ranking for each of the plurality of EASs; and
    notifying to the UE information to access at least one EAS service through the selected EAS.

5. The method of claim 1, wherein the data path change notification indicates that the UE moves from one multi-access edge computing (MEC) service area to another MEC service area.

6. The method of claim 1, further comprising:
    obtaining, by the edge network entity, a plurality of third parameters from the UE, the plurality of third parameters including an identity (ID) of the UE, a type of application, a source internet protocol (IP) address, a destination IP address, a source port, a destination port, a type of service, and a maximum throughput transferred to a user plane entity;
    storing, by the edge network entity, the obtained plurality of third parameters;
    estimating, by the edge network entity, maximum throughput requirements of data sessions associated with the UE by the machine learning based on the stored plurality of third parameters; and
    sending, by the edge network entity, the estimated maximum throughput requirements to at least one of the user plane entity or the session management entity.

7. An edge network entity for initiating a context switchover in a wireless network, the edge network entity comprising:
    a memory;
    a processor; and
    a multi-access edge computing (MEC) controller, operably connected to the memory and the processor, configured to:
        identify a plurality of first parameters associated with a user equipment (UE) and a plurality of second parameters associated with the edge network entity;

receive a data path change notification of the UE from a session management entity;

determine a ranking for each of a plurality of edge application servers (EASs) based on the plurality of first parameters and the plurality of second parameters, in response to reception of the data path change notification;

select at least one target EAS of the plurality of EASs based on the ranking for each of the plurality of EASs; and perform the context switchover to the at least one target EAS, wherein the ranking for each of the plurality of EASs is determined based on a machine learning for obtaining a correlation of the plurality of first parameters and the plurality of second parameters.

8. The edge network entity of claim 7, wherein the plurality of first parameters comprises at least one of a preference for an EAS selection pattern for a specific application of the UE or a type of an application of the UE.

9. The edge network entity of claim 7, wherein the plurality of second parameters comprises at least one of a required quality of service (QOS) at an edge configuration server (ECS), a current computing load of each of the plurality of EASs, a network load at each of the plurality of EASs, a network topology, key performance indicators (KPIs) of each of the plurality of EASs, an identity (ID) of each of the plurality of EASs, a type of each of the plurality of EASs, a service supported by each of the plurality of EASs, a maximum request rate processed by each of the plurality of EASs, an average response time at each of the plurality of EASs, or a number of the UE subscribe in each of the plurality of EASs.

10. The edge network entity of claim 7, wherein the MEC controller is further configured to:

identify a plurality of EAS services provided by the plurality of EASs;

receive a discovery request from the UE to select at least one EAS of the plurality of EASs; and rank each of the plurality of EASs based on the machine learning for obtaining the correlation of the plurality of first parameters and the plurality of second parameters.

11. The edge network entity of claim 7, wherein the data path change notification indicates that the UE moves from one MEC service area to another MEC service area.

12. The edge network entity of claim 7, wherein the MEC controller is further configured to:

obtain a plurality of third parameters from the UE, wherein the plurality of third parameters includes an identity (ID) of the UE, a type of application, a source internet protocol (IP) address, a destination IP address, a source port, a destination port, a type of service, and a maximum throughput transferred to a user plane entity;

store the obtained plurality of third parameters;

estimate maximum throughput requirements of data sessions associated with the UE by the machine learning based on the stored plurality of third parameters; and send the estimated maximum throughput requirements to at least one of the user plane entity or the SMF entity.

13. A non-transitory computer readable medium comprising program code for processing a dialog between a user and an electronic device that, when executed by at least one processor, causes an electronic device to:

identify a plurality of first parameters associated with a user equipment (UE) and a plurality of second parameters associated with the edge network entity;

receive a data path change notification of the UE from a session management entity;

determine a ranking for each of a plurality of edge application servers (EASs) based on the plurality of first parameters and the plurality of second parameters, in response to reception of the data path change notification;

select at least one target EAS of the plurality of EASs based on the ranking for each of the plurality of EASs; and perform the context switchover to the at least one target EAS, wherein the ranking for each of the plurality of EASs is determined based on a machine learning for obtaining a correlation of the plurality of first parameters and the plurality of second parameters.

14. The non-transitory computer readable medium of claim 13, comprising computer code that, when executed by the at least one processor, cause the electronic device to:

determine the ranking for each of the plurality of EASs based on the machine learning for obtaining the correlation of the plurality of first parameters and the plurality of second parameters.

15. The non-transitory computer readable medium of claim 13, wherein the plurality of first parameters comprises at least one of a preference for an EAS selection pattern for a specific application of the UE or a type of an application of the UE.

16. The non-transitory computer readable medium of claim 13, wherein the plurality of second parameters comprises at least one of a required quality of service (QOS) at an edge configuration server (ECS), a current computing load of each of the plurality of EASs, a network load at each of the plurality of EASs, a network topology, key performance indicators (KPIs) of each of the plurality of EASs, an identity (ID) of each of the plurality of EASs, a type of each of the plurality of EASs, a service supported by each of the plurality of EASs, a maximum request rate processed by each of the plurality of EASs, an average response time at each of the plurality of EASs, or a number of the UE subscribed in each of the plurality of EASs.

17. The non-transitory computer readable medium of claim 13, comprising computer code that, when executed by the at least one processor, causes the electronic device to:

identify a plurality of EAS services provided by the plurality of EASs;

receive a discovery request from the UE to select at least one EAS of the plurality of EASs; and rank each of the plurality of EASs based on the machine learning for obtaining a correlation of the plurality of first parameters and the plurality of second parameters.

18. The non-transitory computer readable medium of claim 13, wherein the data path change notification indicates that the UE moves from one MEC service area to another MEC service area.

* * * * *